United States Patent [19]

Takagi

[11] Patent Number: 5,749,057
[45] Date of Patent: May 5, 1998

[54] TELEPHONE HANDSET FOR HANDS-FREE USE IN AN AUTO MOBILE

[75] Inventor: Kotaro Takagi, Tokyo, Japan

[73] Assignee: Sony Corporation, Tokyo, Japan

[21] Appl. No.: 552,864

[22] Filed: Nov. 3, 1995

[30] Foreign Application Priority Data

Nov. 8, 1994 [JP] Japan ................................ 6-298914

[51] Int. Cl.$^6$ ............................. H04M 11/00; H04Q 7/00
[52] U.S. Cl. ............................................ 455/569; 379/420
[58] Field of Search .......................... 379/58, 430, 420, 379/455; 455/89, 569, 570, 575

[56] References Cited

U.S. PATENT DOCUMENTS

| | | | |
|---|---|---|---|
| 4,056,696 | 11/1977 | Meyerle et al. | 379/58 X |
| 4,878,237 | 10/1989 | Cianflone | 379/58 |
| 5,212,722 | 5/1993 | Murata | 455/570 |
| 5,261,121 | 11/1993 | Hashimoto | 455/89 |
| 5,282,246 | 1/1994 | Yang | 379/455 |
| 5,490,213 | 2/1996 | Huang | 379/442 |
| 5,504,812 | 4/1996 | Vangarde | 379/430 |
| 5,583,919 | 12/1996 | Talvard et al. | 379/67 |
| 5,586,183 | 12/1996 | Marcus et al. | 379/433 |
| 5,589,947 | 12/1996 | Sato et al. | 386/96 |
| 5,590,417 | 12/1996 | Rydbeck | 455/89 |
| 5,596,638 | 1/1997 | Paterson et al. | 379/430 |
| 5,642,402 | 6/1997 | Vilmi | 455/569 |
| 5,659,887 | 8/1997 | Ooe | 455/575 |

FOREIGN PATENT DOCUMENTS 0637874  3/1993  Japan .

Primary Examiner—Allen R. MacDonald
Assistant Examiner—Scott Richardson
Attorney, Agent, or Firm—Jay H. Maioli

[57] ABSTRACT

A portable telephone which solves problems conventionally associated with using a portable telephone together with a hands-free accessory is disclosed. When the portable telephone is being used on its own and a microphone arm thereof is in a home position, the portable telephone can be put in a waiting state wherein it can receive incoming calls. When the portable telephone is being used on its own and the microphone arm is in a pulled-out position, telephone conversations can be had using a microphone and a speaker built into the portable telephone. When the portable telephone is connected to a hands-free accessory and the microphone arm is in its home position, conversations can be had in a hands-free mode using a microphone and a speaker connected to the hands-free accessory. When the portable telephone is connected to a hands-free accessory and the microphone arm is in its pulled-out position, conversations can be had in a normal mode using the microphone and the speaker built into the portable telephone even though the portable telephone is connected to the hands-free accessory. As a result, no special key for mode changeover between the hands-free mode and the normal mode need be provided either on the portable telephone side or on the hands-free accessory side, nor is it necessary to perform a two-step key pressing operation to effect mode changeover.

3 Claims, 5 Drawing Sheets

TELEPHONE HANDSET FOR HANDS-FREE USE IN AN AUTO MOBILE

FIELD OF THE INVENTION

This invention relates to a portable telephone which can be used together with a hands-free accessory.

BACKGROUND OF THE INVENTION

One accessory for using a portable telephone inside a car is known as a hands-free accessory. When a hands-free accessory is provided in a car and a portable telephone is connected to this hands-free accessory, it is possible to switch between a microphone and a speaker built into the portable telephone and a microphone and a speaker mounted inside the car, so that it is possible to have hands-free telephone conversations.

Also, when a portable telephone is used inside a car and the antenna of the portable telephone consequently becomes shielded by the body of the car, if the portable telephone is connected to a hands-free accessory the antenna of the portable telephone is connected to an external antenna mounted for example above the trunk of the car and as a result there is no loss of sensitivity of reception due to the shielding effect of the car body. Furthermore, because when a portable telephone is connected to a hands-free accessory, power is supplied to the portable telephone.

However, when a hands-free accessory is used to conduct a hands-free telephone conversation, the voice of the other party comes out of the speaker mounted inside the car. If there is another person in the car, this is sometimes inconvenient.

To solve this problem, actual hands-free accessories are designed so that even when the portable telephone is connected to the hands-free accessory it is still possible to have a telephone conversation using the microphone and the speaker built into the portable telephone. That is, it is possible to selectively use either a hands-free mode wherein the speaker and microphone of the hands-free accessory are used or a normal mode wherein the speaker and microphone of the portable telephone are used.

For switching between the hands-free mode and the normal mode there are mainly the following three methods:

[1] Providing the hands-free accessory with a mode changeover switch.

[2] Providing the portable telephone with a mode changeover switch.

[3] Performing mode changeover using a function key of the portable telephone.

However, in case [1] it is necessary for the hands-free accessory to inform the portable telephone of the current mode, and because for this an extra connection line between the hands-free accessory and the portable telephone is needed and a mode changeover switch is necessary, the cost of the equipment increases.

In case [2] the portable telephone must be provided with an extra operating key, and because portable telephones are small and have small panel areas, this method causes key layout problems, and other keys have to be made smaller, which creates operatability problems. Furthermore, to a user who does not use a hands-free accessory a mode changeover key is useless.

In case [3], because a function key and another operating key have to be pressed in order, a key operation of two or more steps is necessary, and this is troublesome and operatability is impaired.

SUMMARY OF THE INVENTION

Accordingly, an object of the invention is to solve these kinds of problem.

DETAILED DESCRIPTION OF THE PREFERRED EMBODIMENTS

Figure 1:
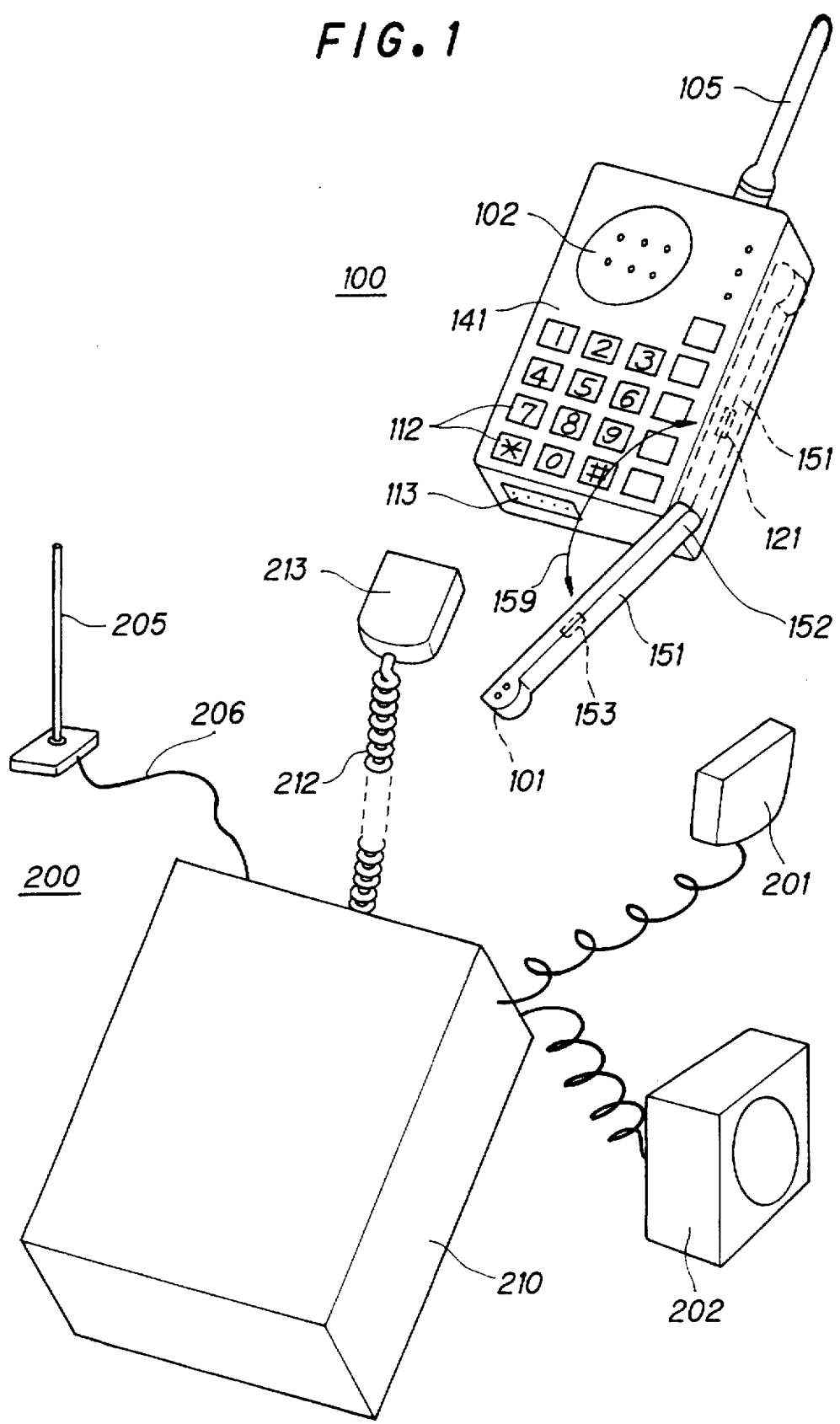
FIG. 1 is a perspective view of a preferred embodiment of the invention.

FIG. 1 shows the exterior of a portable telephone 100 and a hands-free accessory 200 according to the invention.

A flat, rectangular boxlike plastic case 141 constitutes the main body of the portable telephone 100; an antenna 105 for transmission and reception is mounted on the top of the case 141 and a speaker 102 and operating keys 112 such as dialing keys are provided on the front of the case 141.

A pull-out microphone 101 is mounted on for example the right side surface of the case 141. That is, a tubular microphone arm 151 made of a plastic having some elasticity has a lower end pivotally attached by means of a pivot mechanism 152 to the lower end of the right side surface of the case 141 and the microphone 101 is disposed inside the other end of this microphone arm 151. In this preferred embodiment, the microphone arm 151 is pivotable in a plane including the right side surface of the case 141 and also in front of the case 141, as shown by the arrow 159.

Thus in a first state the microphone arm 151 is retracted to a position along the right side surface of the case 141 as shown with broken lines in FIG. 1 (the closed state of the microphone arm 151) and in a second state the microphone arm 151 is pivotally pulled out to a position substantially 180° from the front surface of the case 141 (the open state of the microphone arm 151). The length of the microphone arm 151 and its point of attachment to the case 141 are so set that when the microphone arm 151 has been pulled out to its open position the distance between the microphone 101 and the speaker 102 is about the same as that between the microphone and speaker of an ordinary telephone.

A permanent magnet 153 is mounted inside the central portion of the microphone arm 151, and a Hall effect device 121 serving as a magnetic field sensing device is disposed inside the case 141 in a position such that it faces the permanent magnet 153 when the microphone arm 151 is in its closed position (shown by the broken lines).

A connector jack 113 for connecting a hands-free accessory 200 or the like to the portable telephone 100 is provided in the bottom of the case 141, and although not shown in the drawings this connector jack 113 is covered by a cover when not being used.

The size of this portable telephone 100 when the microphone arm 151 is in its closed state is for example about 86 mm (height)×64 mm (width)×24 mm (depth).

A main unit 210 of the hands-free accessory 200 is disposed for example in a vehicle between a driver's seat and a passenger seat or under a dashboard. A connector plug 213 for being connected to the connector jack 113 of the portable telephone 100 is connected to the main unit 210 by a curl cord 212.

A microphone 201 and a speaker 202 for hands-free use are connected to the main unit 210 by cords. The microphone 201 and the speaker 202 may be mounted anywhere in the vehicle the user likes.

Also, an external antenna 205 is connected to the main unit 210 by a coaxial cable 206. In this preferred embodiment, the external antenna 205 is for example mounted above the trunk of the vehicle.

Figure 2:
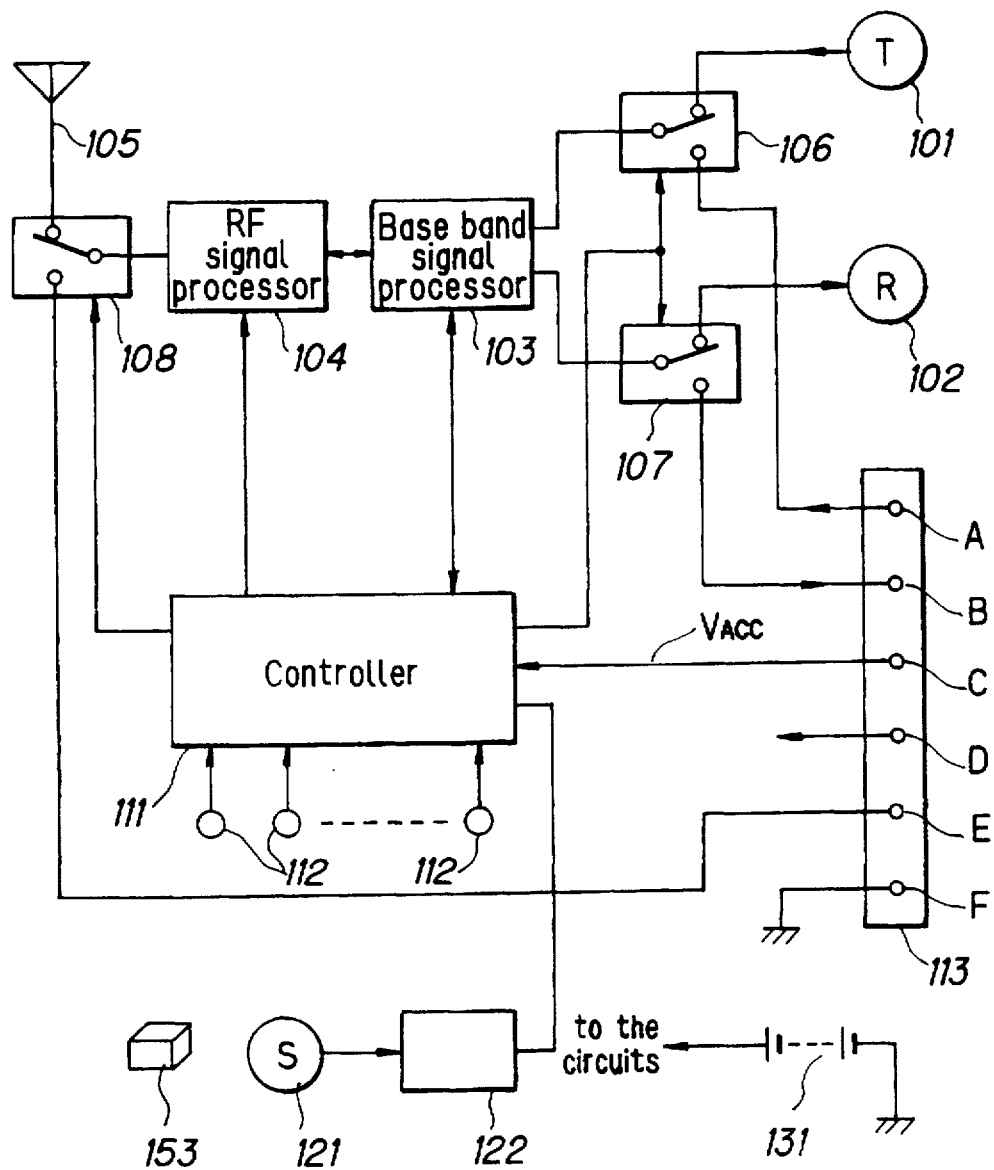
FIG. 2 is a system diagram of the preferred embodiment of the invention.
Figure 3:
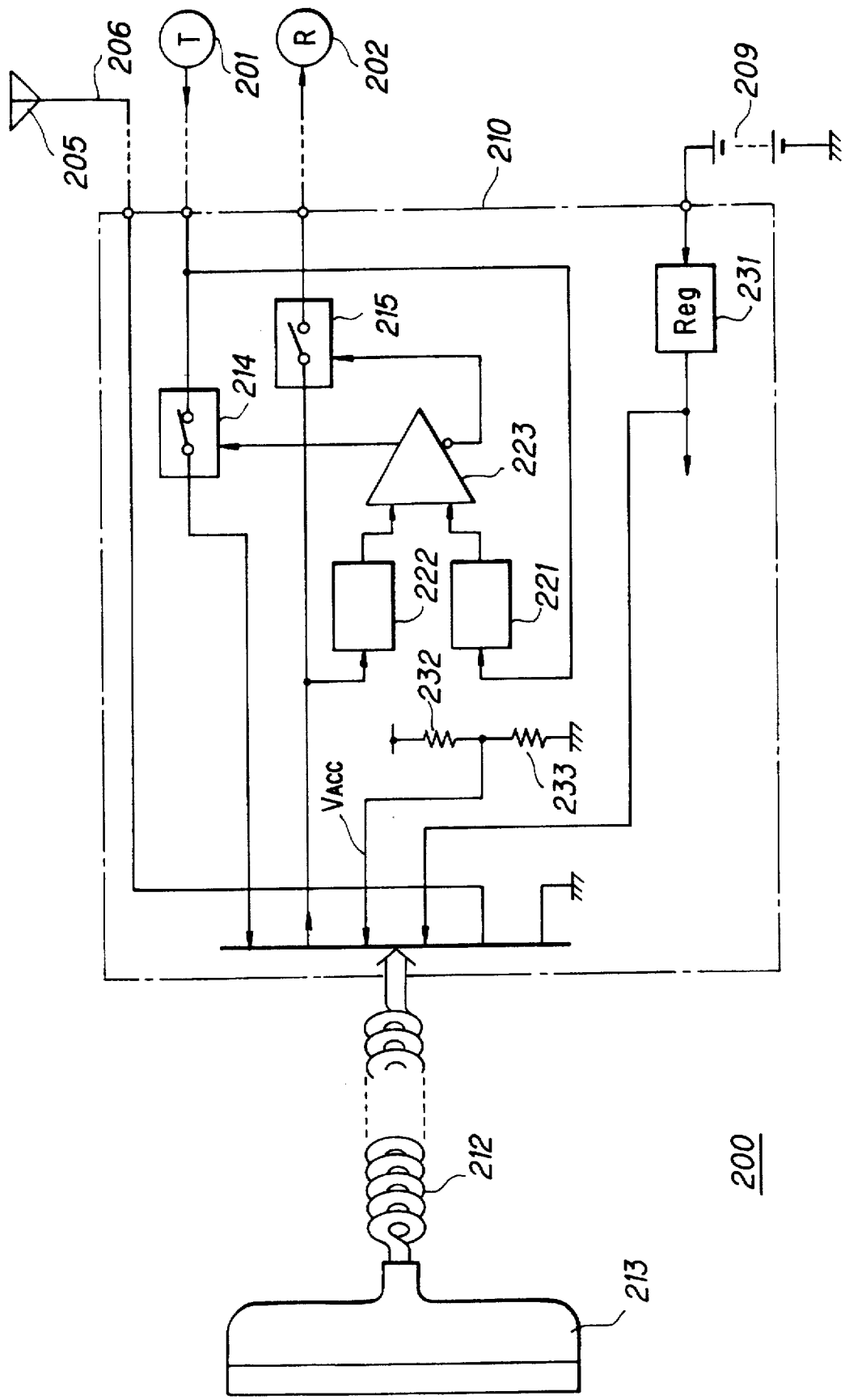
FIG. 3 is a system diagram of an example of a hands-free accessory.

FIG. 2 and FIG. 3 respectively show examples of circuits of the portable telephone 100 and the hands-free accessory 200.

In the portable telephone 100 circuit shown in FIG. 2, a base band signal processor 103 processes for transmission or reception bass band signals such as voice or data signals and an RF signal processor 104 transmits or receives these bass band signals. Switching circuits 106 to 108 are for switching the portable telephone 100 between a normal mode and a hands-free mode.

A controller 111 for system control controls the channels used by the RF signal processor 104 and transmission and reception thereof and carries out control of the base band signal processor 103 and accessing of data through the base band signal processor 103. The controller 111 also controls the switching circuits 106 to 108. Output of the operating keys 112 is fed to the controller 111.

The connector jack 113 has contacts A to F, and these contacts A to F are respectively connected to the circuits. The output signal of the Hall effect device 121 is fed to the controller 111 through a rectifying circuit 122. The output voltage of an internal rechargeable battery 131 is supplied to each of the various circuits.

As will be discussed in detail later, when this portable telephone 100 is connected to the hands-free accessory 200, a voltage $V_{ACC}$ of a predetermined level is supplied to the contact C of the connector jack 113, and the controller 111 determines whether or not the portable telephone 100 is connected to the hands-free accessory 200 by means of this voltage $V_{ACC}$.

In the hands-free accessory 200 circuit shown in FIG. 3, VOX switching circuits 214, 215, detector circuits 221, 222 and a voltage comparator circuit 223 are connected to voice signal lines of the main unit 210.

In this preferred embodiment, the detector circuit 221 detects the level of a voice signal from the microphone 201 and outputs a direct current voltage of a level corresponding to the level of this voice signal. The detector circuit 222 similarly detects the level of a voice signal supplied to the speaker 202 and outputs a direct current voltage of a level corresponding to the level of that voice signal.

The output voltages of these detector circuits 221, 222 are compared by the voltage comparator circuit 223. Outputs of the voltage comparator circuit 223 of opposite phase are supplied to the switching circuits 214, 215 as control signals thereof.

A voltage regulator 231 is also provided in the main unit 210. An output voltage of a car battery 209 is supplied by the voltage regulator 231 and a stabilized output voltage of the voltage regulator 231 is supplied as an operating voltage to the circuits of the main unit 210 and is output through the curl cord 212 to the connector plug 213. Although not shown in the drawings, the connector plug 213 has contacts which are respectively connected to the contacts A to F of the connector jack 113.

The predetermined voltage $V_{ACC}$ is produced by resistors 232, 233 and outputted through the curl cord 212 to the connector plug 213.

With this construction, when the microphone arm 151 is in its closed position as shown by the broken line in FIG. 1 the permanent magnet 153 faces the Hall effect device 121 and when the microphone arm 151 is in its open position as shown with solid lines in FIG. 1 the permanent magnet 153 does not face the Hall effect device 121. As a result, by checking the output signal of the rectifying circuit 122, the controller 111 can detect whether the microphone arm 151 is in its closed position or in its open position.

When the connector plug 213 is connected to the connector jack 113, the voltage $V_{ACC}$ from the resistors 232, 233 is fed through the connector plug 213 to the contact C of the connector jack 113. However, when the connector plug 213 is not connected to the connector jack 113, no voltage is fed to the contact C of the connector jack 113. As a result, by checking the voltage level of the contact C of the connector jack 113, the controller 111 can detect whether or not the hands-free accessory 200 is connected to the portable telephone 100 or whether the portable telephone 100 is on its own.

The following kinds of operations are performed with respect to the above detection results. These operations are shown in the flow chart of FIG. 5. The following description is divided into a description of a case wherein the portable telephone 100 is used on its own and a description of a case wherein the hands-free accessory 200 is used; however, the actual operation of the device is as shown in the flow chart.

1 When the Portable Telephone 100 is Used On Its Own

1—1 When the Microphone Arm 151 is in its Closed Position

In this case, the switching circuits 106 to 108 are put by the controller 111 into for example the states in which they are shown in FIG. 2.

When a power switch of the portable telephone 100 is turned ON, the portable telephone 100 goes into a waiting mode. That is, in this case, the RF signal processor 104, the base band signal processor 103 and part of the controller 111 are activated and the portable telephone 100 is able to respond to an incoming call request or the like from a portable telephone base station.

However, if an operating key 112 is depressed, the key output is ignored. As a result, when the portable telephone 100 is in a bag or a pocket or the like, even if a key 112 is accidently depressed, that key operation is ineffective; in other words, a failsafe function is in operation.

1-2 When the Microphone Arm 151 is in its Open Position

In this case also the switching circuits 106 to 108 are put by the controller 111 into the states in which they are shown in FIG. 2.

By the microphone arm 151 being opened, the portable telephone 100 is rendered usable. That is, when from the waiting mode the microphone arm 151 is opened, operation of the keys 112 becomes effective and it is possible for example to make a call.

When the microphone arm 151 is opened because there is an incoming call while the portable telephone 100 is in the waiting mode, a connection protocol is executed with respect to the incoming call and the portable telephone 100 is connected to the caller via the base station.

During an outgoing or incoming call, a user's voice signal is fed from the microphone 101 through the switching circuit 106 to the base band signal processor 103 where it undergoes transmission processing. This processed voice signal is then fed to the RF signal processor 104 and turned into an outward channel transmission signal, and this transmission signal is fed through the switching circuit 108 to the antenna 105 and transmitted to the base station.

A signal transmitted from the base station on an inward channel is received by the antenna 105, this received signal is fed through the switching circuit 108 to the RF signal processor 104 where a voice signal of the other party is extracted from it, and this voice signal is fed to the base band signal processor 103 where it undergoes reception processing. This processed voice signal is then fed through the switching circuit 107 to the speaker 102.

Thus, when the portable telephone 100 is on its own, it can be used in the same way as an ordinary portable telephone. Furthermore, it has a failsafe function with respect to the operating keys 112.

2 When the Portable Telephone 100 is Connected to the Hands-free Accessory 200

2-1 When the Microphone Arm 151 is in its Closed Position

In this case, the switching circuits 106 to 108 are put by the controller 111 into states the reverse of those in which they are shown in FIG. 2.

The output voltage of the car battery 209 is fed through the voltage regulator 231, the curl cord 212, the connector plug 213 and the contact D of the connector jack 113 to the portable telephone 100 and to the circuits of the portable telephone 100 as an operating voltage thereof, and the rechargeable battery 131 is charged.

During a call, a voice signal of the user is fed through the microphone 201, the switching circuit 214, the connector plug 213, the contact A of the connector jack 113 and the switching circuit 106 to the base band signal processor 103. Thereafter, in the same way as when the portable telephone 100 is on its own, this voice signal is turned into an outward channel transmission signal and outputted by the RF signal processor 104.

The transmission signal from the RF signal processor 104 then passes through the switching circuit 108, the contact E of the connector jack 113, the connector plug 213, the curl cord 212, an internal wire of the main unit 210 and the coaxial cable 206 to the external antenna 205 and is transmitted to the base station.

A signal transmitted from the base station on an inward channel is received by the external antenna 205, and in the reverse of the above is fed through the coaxial cable 206, an internal wire of the main unit 210, the curl cord 212, the connector plug 213, the contact E of the connector jack 113 and the switching circuit 108 to the RF signal processor 104, whereafter a voice signal of the other party is output by the base band signal processor 103. This voice signal is then fed through the switching circuit 107, the contact B of the connector jack 113, the connector plug 213, the curl cord 212 and the switching circuit 215 to the speaker 202.

However, in this case, when both the microphone 201 and the speaker 202 are simultaneously active, howling and echo occur. To avoid this, in this example, the level of the user's voice signal and the level of the other party's voice signal are compared by the voltage comparator circuit 223 and, the switching circuits 214, 215 are mutually oppositely ON/OFF controlled by the comparison output of the voltage comparator circuit 223. Of the switching circuits 214 and 215, the switching circuit in the signal line of the voice signal which is at the higher level is switched ON and the other switching circuit is switched OFF.

In this way, hands-free dialogue is made possible.

2—2 When the Microphone Arm 151 is in its Open Position

For example when the user does not want the content of a conversation to be heard, the user pulls down the microphone arm 151 to its open position. When this is done, the switching circuits 106 and 107 are put by the controller 111 into the states in which they are shown in FIG. 2 and the switching circuit 108 is put into the opposite state to that in which it is shown in FIG. 2.

As a result, in this case, as described above under heading 1-2, the microphone 101 and the speaker 102 can be used and the content of the conversation, and particularly the voice of the other party, is not heard by other people in the vehicle.

In this case, because the switching circuit 108 is in the opposite state to that in which it is shown in FIG. 2, transmission of waves to the base station is carried out using the external antenna 205 as described under heading 2-1.

Figure 5:
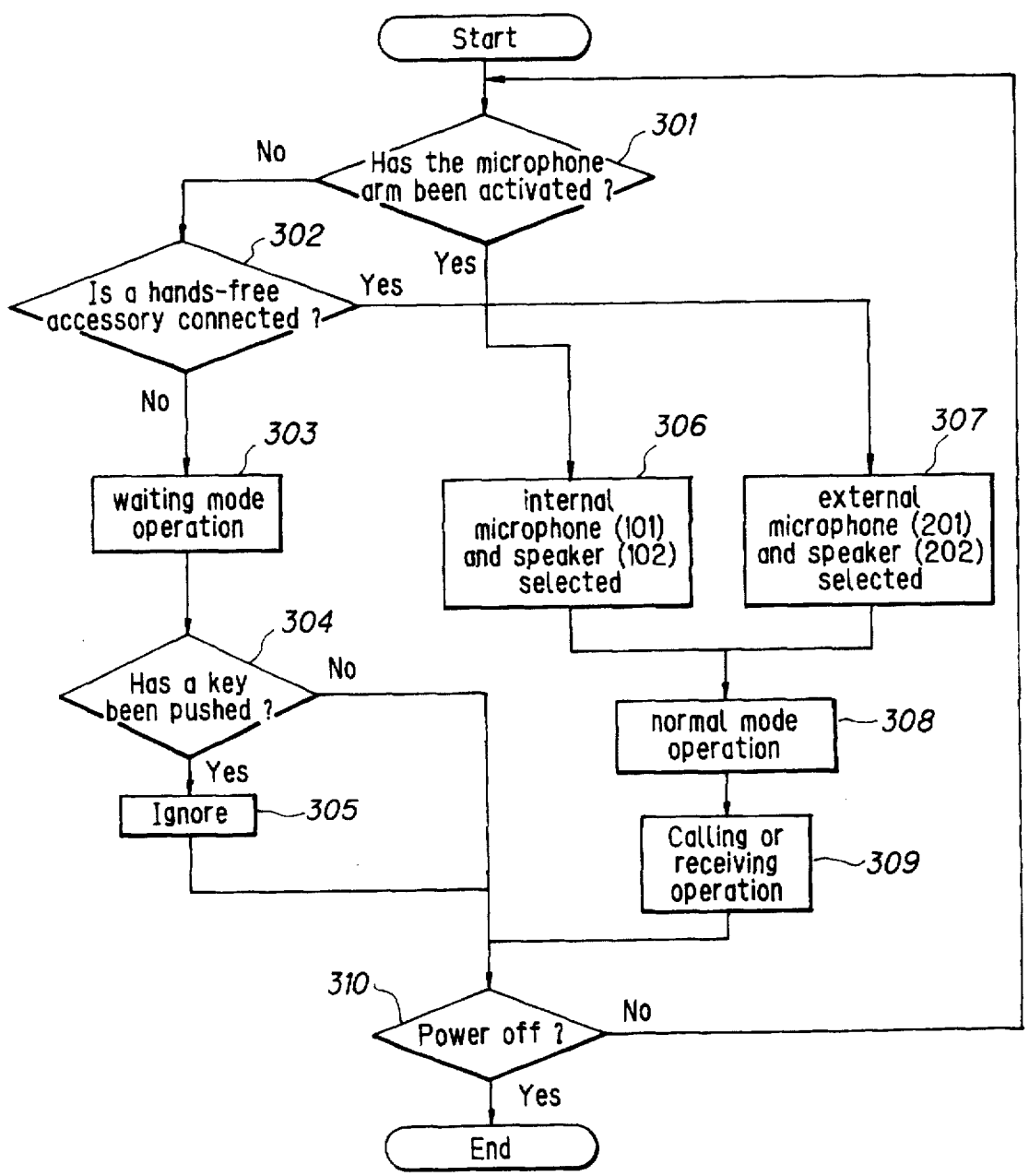
FIG. 5 is a flowchart showing the operational steps of the preferred embodiment of the invention.

The flow chart of FIG. 5 will now be explained.

First, in step 301, it is determined whether or not the microphone arm 151 has been pulled out. If it has not been pulled out, processing proceeds to step 302. In step 302, it is determined whether or not the hands-free accessory 200 has been connected to the portable telephone 100. If it has not been connected, processing proceeds to step 303. Step 303 is the waiting mode wherein key inputs are ignored, as shown in steps 304, 305.

When in step 302 it is determined that the hands-free accessory 200 is connected to the portable telephone 100, processing proceeds to step 307. In step 307, the microphone 201 and the speaker 202 are selected. In steps 308, 309 the portable telephone 100 goes into the normal mode and calling and receiving are carried out.

When on the other hand in step 301 it is determined that the microphone arm 151 has been pulled out, processing proceeds immediately to step 306 and the microphone 101 and the speaker 102 built into the portable telephone 100 itself are used. The portable telephone 100 then goes into the normal mode in steps 308, 309 in the same way as described above.

When this is finished processing proceeds to step 310 and it is determined whether or not the power switch is OFF. When it is OFF, all processing is halted and when it is ON processing is repeated from the beginning.

As described above, this portable telephone 100 can be used on its own or connected to the hands-free accessory 200, and even when the portable telephone 100 is connected to the hands-free accessory 200 it is possible to change between the normal mode and the hands-free mode just by opening and closing the microphone arm 151. Furthermore, because this opening and closing of the microphone arm 151 is the same operation as when the portable telephone 100 is being used on its own, changing over between the normal mode and the hands-free mode can be carried out extremely naturally even when the portable telephone 100 is connected to the hands-free accessory 200.

Also, it is not necessary to provide the hands-free accessory 200 with a switch for changing between modes as it is in the case [1] mentioned above in connection with the background of the invention, and therefore there is the cost merit that there is no need to increase the number of connecting lines or the number of contacts of the connectors 113, 213.

Furthermore, because it is not necessary to increase the number of operating keys 112 of the portable telephone 100 as it is in the case [2] mentioned above, there is no need to impair the operatability of the portable telephone 100 by changing the key layout or the sizes of the keys. Therefore, no problems are suffered by users who do not use the hands-free accessory 200. Also, because it is not necessary to push function keys or the like in two or more steps as it is in the case [3] mentioned above, the operatability of the portable telephone 100 is improved.

Figure 4:
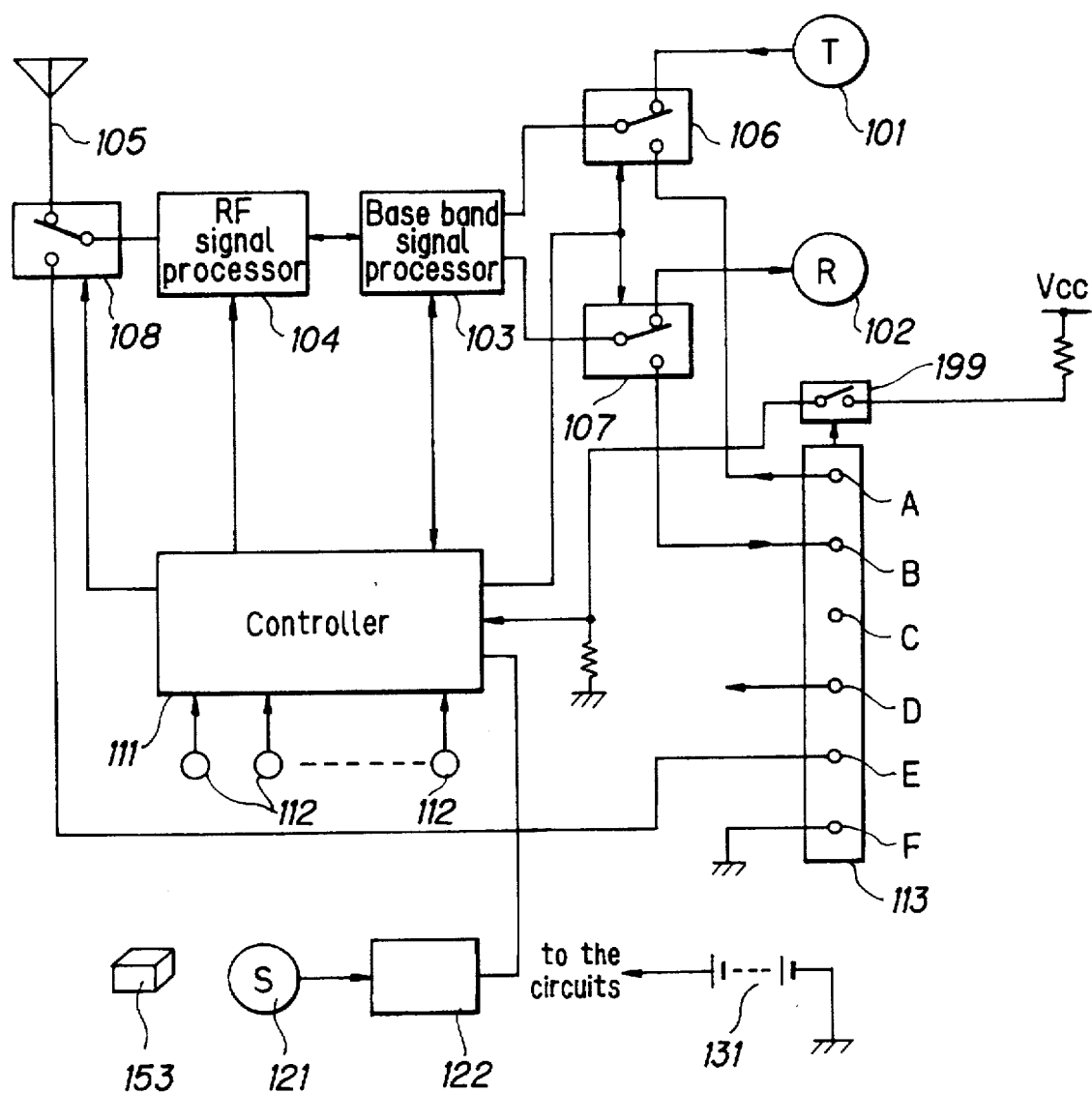
FIG. 4 is a system diagram of an alternate embodiment of the invention.

In the preferred embodiment described above, a voltage $V_{ACC}$ from the hands-free accessory 200 is used to indicate whether or not the portable telephone 100 is connected to the hands-free accessory 200; however, alternatively a switch 199 mechanically switched ON and OFF when the connector plug 213 is plugged into and removed from the connector jack 113 may be provided, and whether or not the portable telephone 100 is connected to the hands-free accessory 200 may be detected from the output of this switch 199. This is shown FIG. 4.

According to the invention, even when the portable telephone 100 is connected to the hands-free accessory 200 it is possible to change between the normal mode and the hands-free mode just by opening and closing the microphone arm 151. Furthermore, because this opening and closing of the microphone arm 151 is the same operation as when the portable telephone 100 is being used on its own, changing over between the normal mode and the hands-free mode can be carried out extremely naturally even when the portable telephone 100 is connected to the hands-free accessory 200.

Also, it is not necessary to provide the hands-free accessory 200 with a switch for changing between modes as it is in the case [1] mentioned above in connection with the background of the invention, and therefore there is the cost benefit that there is no need to increase the number of connecting lines or the number of contacts of the connectors 113, 213.

Furthermore, because it is not necessary to increase the number of operating keys 112 of the portable telephone 100 as it is in the case [2] mentioned above, there is no need to impair the operatability of the portable telephone 100 by changing the key layout or the sizes of the keys. Therefore, no problems are suffered by users who do not use the hands-free accessory 200. Also, because it is not necessary to push function keys or the like in two or more steps as it is in the case [3] mentioned above, the operatability of the portable telephone 100 is improved.

What is claimed is:

1. A telephone handset for hands-free use in an automobile comprising:

a handset including a microphone activated in a first mode;

a speaker activated in said first mode;

an arm having said microphone mounted thereon and being changeable from a first position to a second position;

position detection means for detecting a position of said arm;

switch means for switching between a use status or a non-use status of said microphone and speaker according to said first mode; and control means for determining whether a status of the telephone apparatus is said first mode;

an accessory apparatus for connection to said handset via a detachable connector, wherein said accessory apparatus includes a radio frequency antenna for communicating a transmitted signal from said handset;

accessory connecting detecting means for detecting whether said accessory apparatus is connected to said handset wherein said control means determines whether the telephone is in said first mode depending on the output of the accessory connecting detecting means and the position detecting means; and a magnet located at a predetermined position on said arm, and wherein said position detection means includes magnetic field detection means located at a position corresponding to a position of said magnet when said arm is in said first position.

2. A telephone apparatus as claimed in claim 1 wherein said arm position is changeable between said first position and said second position by rotating around a predetermined axis at an end of said arm.

3. A method of communication comprising steps of:

detecting if a first unit is connected with an accessory apparatus;

determining a mode that determines whether a first set of a microphone and a speaker housed within said first unit is used or a second set of a microphone and a speaker housed within said accessory apparatus is used including detecting a status of a microphone arm of said first unit;

detecting a connection status of said accessory apparatus to said first unit;

operating the first unit in a waiting mode if said accessory apparatus is not connected;

operating the first unit with a fail safe function if an actuating key thereof is operated during the waiting mode;

selecting said first or second set of a microphone and a speaker according to said mode determined in said step of determining;

establishing a connection between said accessory apparatus and a telephone network in a predetermined manner;

communicating audio signals between said first unit and said accessory apparatus, whereby said audio signals are modulated according to a predetermined format by said first unit;

communicating said modulated signals to said accessory apparatus; and communicating with said telephone network in a predetermined manner using said modulated signals.

* * * * *